(12) United States Patent
Kandori

(10) Patent No.: US 10,777,938 B2
(45) Date of Patent: Sep. 15, 2020

(54) CONNECTOR

(71) Applicant: MAKITA CORPORATION, Anjo-shi, Aichi (JP)

(72) Inventor: Hironori Kandori, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/596,855

(22) Filed: Oct. 9, 2019

(65) Prior Publication Data

US 2020/0119491 A1  Apr. 16, 2020

(30) Foreign Application Priority Data

Oct. 12, 2018  (JP) ................... 2018-193582

(51) Int. Cl.
| | |
|---|---|
| H01R 13/62 | (2006.01) |
| H01R 13/627 | (2006.01) |
| H01R 13/10 | (2006.01) |
| H01R 13/04 | (2006.01) |

(52) U.S. Cl.
CPC ......... *H01R 13/6272* (2013.01); *H01R 13/04* (2013.01); *H01R 13/10* (2013.01)

(58) Field of Classification Search
CPC ..... H01R 13/6272; H01R 13/04; H01R 13/10
USPC ......................................... 439/353
See application file for complete search history.

(56) References Cited

U.S. PATENT DOCUMENTS

| | | | | |
|---|---|---|---|---|
| 4,090,759 A * | 5/1978 | Herrmann, Jr. | ........ | H01R 13/53 439/281 |
| 4,191,443 A * | 3/1980 | Doyle | .................. | H01R 13/506 439/462 |
| 4,832,615 A * | 5/1989 | Thakrar | ............. | H01R 13/5219 439/272 |
| 6,382,998 B2 * | 5/2002 | Miwa | .................. | H01R 13/6485 439/181 |
| 7,255,613 B2 * | 8/2007 | Mackey | ............... | H01R 13/405 439/736 |
| 7,316,584 B2 * | 1/2008 | Mackillop | .......... | H01R 13/6463 439/607.05 |
| 8,011,945 B2 * | 9/2011 | Seong | .................... | H01R 13/53 439/345 |
| 8,215,992 B1 * | 7/2012 | Herrmann | .......... | H01R 13/6616 439/620.01 |
| 8,764,471 B2 * | 7/2014 | Dang | .................. | H01R 13/6463 439/310 |

(Continued)

FOREIGN PATENT DOCUMENTS

WO  2018/050980 A1  3/2018

*Primary Examiner* — Abdullah A Riyami
*Assistant Examiner* — Vladimir Imas
(74) *Attorney, Agent, or Firm* — Oliff PLC

(57) ABSTRACT

A connector in one aspect of the present disclosure includes a first housing and a second housing. The first housing includes a first terminal, an insertion portion, and a displacement portion. The displacement portion is provided at an outer periphery of the insertion portion and includes a moving member. The second housing includes a second terminal and a tubular portion. The tubular portion allows insertion therein of the insertion portion to a locking position while the moving member is elastically displaced to an inner position. The tubular portion also includes a locking portion that locks with the moving member to thereby inhibit pullout of the insertion portion from the tubular portion.

12 Claims, 8 Drawing Sheets

(56) References Cited

U.S. PATENT DOCUMENTS

| | | | | |
|---|---|---|---|---|
| 8,979,592 B2* | 3/2015 | Dang | ............ | H01R 13/6582 |
| | | | | 439/607.41 |
| 9,257,796 B1* | 2/2016 | Dang | ............ | H01R 9/035 |
| 9,306,312 B2* | 4/2016 | Dang | ............ | H01R 13/6586 |
| 9,306,333 B2* | 4/2016 | Dang | ............ | H01R 13/6461 |
| 10,103,496 B2* | 10/2018 | Fabre | ............ | H01R 9/0527 |
| 10,461,455 B2* | 10/2019 | Liber | ............ | H01R 13/26 |
| 2004/0157493 A1* | 8/2004 | Bergner | ............ | H01R 9/032 |
| | | | | 439/607.41 |
| 2011/0189878 A1* | 8/2011 | Rogers | ............ | H01R 13/52 |
| | | | | 439/271 |
| 2014/0120769 A1* | 5/2014 | Dang | ............ | H01R 13/502 |
| | | | | 439/607.05 |
| 2015/0270647 A1* | 9/2015 | Hoher | ............ | H01R 24/568 |
| | | | | 439/607.05 |

\* cited by examiner

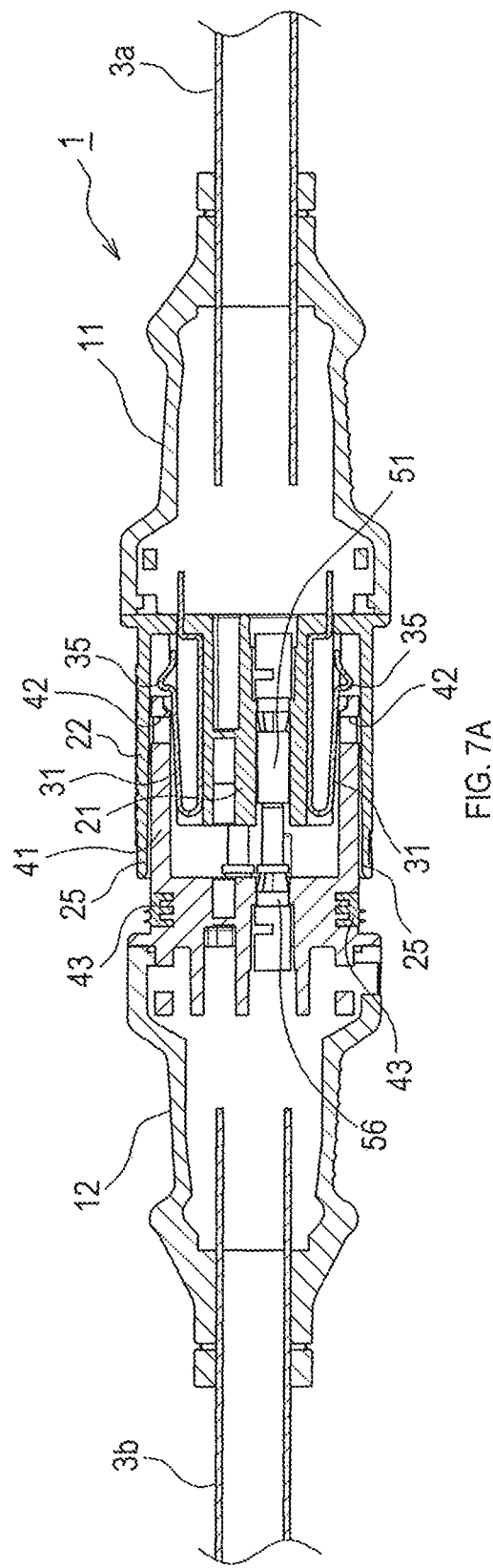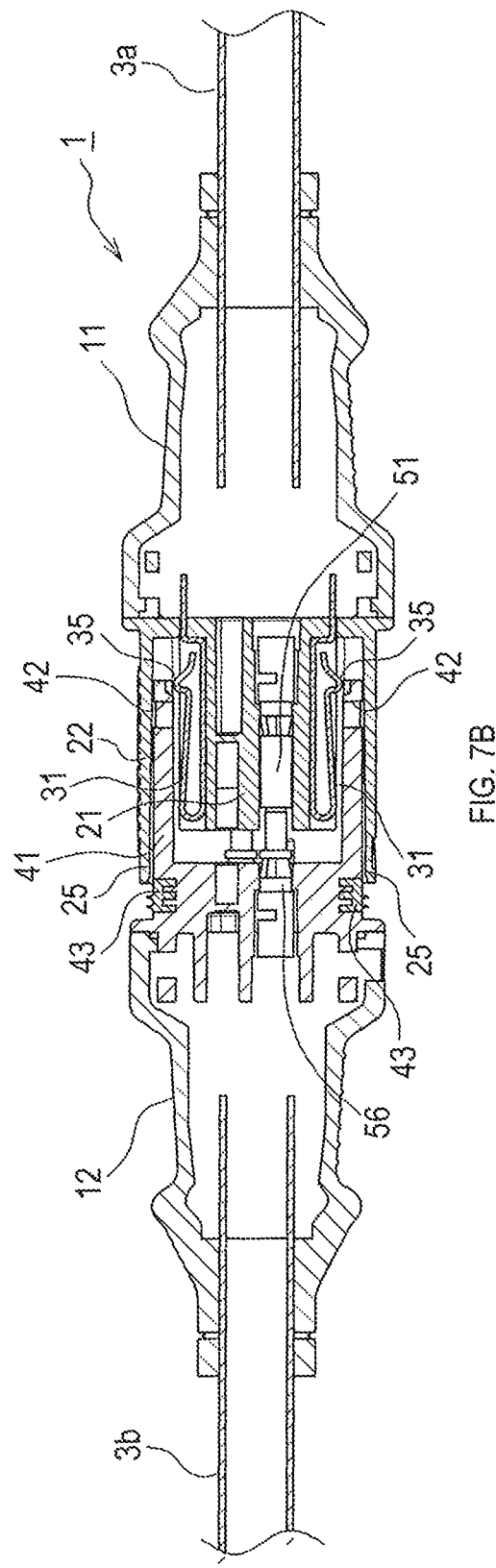
FIG. 7A
FIG. 7B

CONNECTOR

CROSS-REFERENCE TO RELATED APPLICATIONS

The present application claims the benefit of Japanese Patent Application No. 2018-193582 filed on Oct. 12, 2018 with the Japan Patent Office, the entire disclosure of which is incorporated herein by reference.

BACKGROUND

The present disclosure relates to a connector.

Connectors for coupling two cables have been conventionally used. One example of such a connector disclosed in WO2018/050980 is configured to maintain an engaged state by using a metal spring.

SUMMARY

A connector for coupling cables is preferably reduced in size as much as possible, in order to achieve an improvement in mobility.

In one aspect of the present disclosure, it is preferable to provide a connector that enables size reduction.

A connector for coupling a first cable and a second cable in one aspect of the present disclosure includes: a first housing and a second housing. The first housing includes a first terminal to be electrically coupled to the first cable. The second housing includes a second terminal to be electrically coupled to the second cable.

The first housing further includes an insertion portion and a displacement portion. The insertion portion has a columnar shape with a length along a specified direction. The displacement portion is provided at an outer periphery of the insertion portion and includes a moving member elastically displaceable in an intersecting direction that intersects the specified direction.

The second housing further includes a tubular portion configured to allow insertion therein of the insertion portion to a locking position in which the first terminal and the second terminal are electrically coupled to each other.

The tubular portion is configured to abut the moving member to thereby inhibit insertion of the insertion portion through to the locking position, while the moving member is not elastically displaced. The tubular portion is also configured to allow insertion of the insertion portion through to the locking position and pullout of the insertion portion from the locking position, while the moving member is elastically displaced to an inner position, which is a position close to a central axis of the insertion portion. The tubular portion further includes a locking portion. The locking portion is configured, while the insertion portion is located in the locking position, to allow movement of the moving member outwardly from the inner position, and to lock with the moving member, to thereby inhibit pullout of the insertion portion from the tubular portion.

According to the connector with such configuration, an engaged state between the first housing and the second housing can be maintained by locking between the moving member and the locking portion using an elastic force of the displacement portion. The displacement portion is arranged at an outer periphery of the insertion portion. When engaging the first housing with the second housing, the moving member is displaced toward a central axis of the insertion portion (that is, inwardly). Thus, the tubular portion of the second housing is not required to provide a space for displacement of the moving member, which allows size reduction of the second housing. This enables size reduction of the entire connector.

In the connector, the first terminal may be arranged in the insertion portion. If the first terminal is provided outside the insertion portion, the first housing is required to provide a space for arranging the first terminal separately from the insertion portion. This will lead to size increase of the first housing. In contrast, arrangement of the first terminal inside the insertion portion can inhibit size increase of the first housing due to the first terminal.

The insertion portion may include a groove recessed toward the central axis of the insertion portion. The displacement portion may be at least partially arranged in the groove. In this case, a protrusion amount of the displacement portion from the insertion portion can be reduced. This enables size reduction of the tubular portion, and thus size reduction of the entire connector.

In the connector, the displacement portion may be formed of a spring member. The displacement portion may include a plate-shaped fixing portion fixed to the first housing, a movable portion having a facing surface that faces the fixing portion, and a bent portion connecting the fixing portion and the movable portion. Also, the moving member may be provided in the movable portion.

In this case, since a suitable elastic repulsive force can be obtained by the bent-shaped spring member, locking between the moving member and the locking portion can be suitably achieved. Also, the spring member with a bent shape has a large elastically deformable range, and thus provides an improved durability.

The displacement portion may be arranged in the insertion portion such that the bent portion is positioned at a distal side of the insertion portion, and the movable portion is positioned at a proximal side of the insertion portion. In this case, a free end of the movable portion is positioned at the proximal side of the insertion portion, and thus the displacement portion is less likely to be damaged during insertion of the insertion portion into the tubular portion.

Also, in the connector, the moving member may be provided in the displacement portion at a proximal side of the insertion portion.

For example, in a state where the moving member is pressed by the tubular portion toward the inner position, a friction force is generated, and relative movement between the insertion portion and the tubular portion requires a greater force. However, when the moving member is positioned as described above, the moving member does not abut the tubular portion until the insertion portion is inserted deeply into the tubular portion. Thus, it is possible to reduce a range in which the relative movement between the insertion portion and the tubular portion is performed under the friction force.

Further, in the connector, the first housing may include a tubular cover arranged outside the insertion portion and configured to surround the tubular portion upon insertion of the insertion portion into the tubular portion through to the locking position.

In this case, the insertion portion is covered with the cover upon connection of the first and second housings, which enables reducing damage to the first terminal and the second terminal.

An inner surface of the cover may include a first annular portion extending along a circumferential direction of the cover. An outer surface of the tubular portion may include a second annular portion extending along a circumferential direction of the tubular portion. The first annular portion and the second annular portion may be configured to contact each other and form a waterproof structure upon insertion of the insertion portion into the tubular portion through to the locking position. In this case, waterproof function can be provided to the connector, thereby achieving an improved protection of the first terminal and the second terminal.

The second annular portion may include a protruding portion that protrudes outwardly from an area around the second annular portion in the tubular portion. In this case, a sufficient contact can be achieved between the first annular portion and the second annular portion.

At least one of the first annular portion or the second annular portion may be made of an elastically deformable flexible material. In this case, a sufficient contact can be achieved between the first annular portion and the second annular portion.

At least one of the first annular portion or the second annular portion may have a tapered shape with a decreasing thickness toward a protruding end. In this case, generation of an excessive friction force can be inhibited.

In the connector in one aspect of the present disclosure as described above, one of the first cable and the second cable may be coupled to an electric working machine, and the other of the first cable and the second cable may be coupled to a battery that supplies electric power to the electric working machine. In this case, coupling of the electric working machine and the battery can be achieved using the connector.

BRIEF DESCRIPTION OF THE DRAWINGS

An embodiment of the present disclosure will be described hereinafter, by way of example, with reference to the accompanying drawings, in which:

FIG. 7A is a sectional view taken along the same plane as FIG. 1C, showing a state where an insertion portion is being inserted into a tubular portion;

FIG. 7B is a sectional view taken along the same plane as FIG. 1C, showing a state where the insertion portion is inserted into the tubular portion further than in FIG. 7A, and a moving member has moved furthest toward a central axis of the insertion portion;

DETAILED DESCRIPTION OF EXEMPLARY EMBODIMENTS

1. Embodiment 1-1. Overall Configuration

Figure 1:
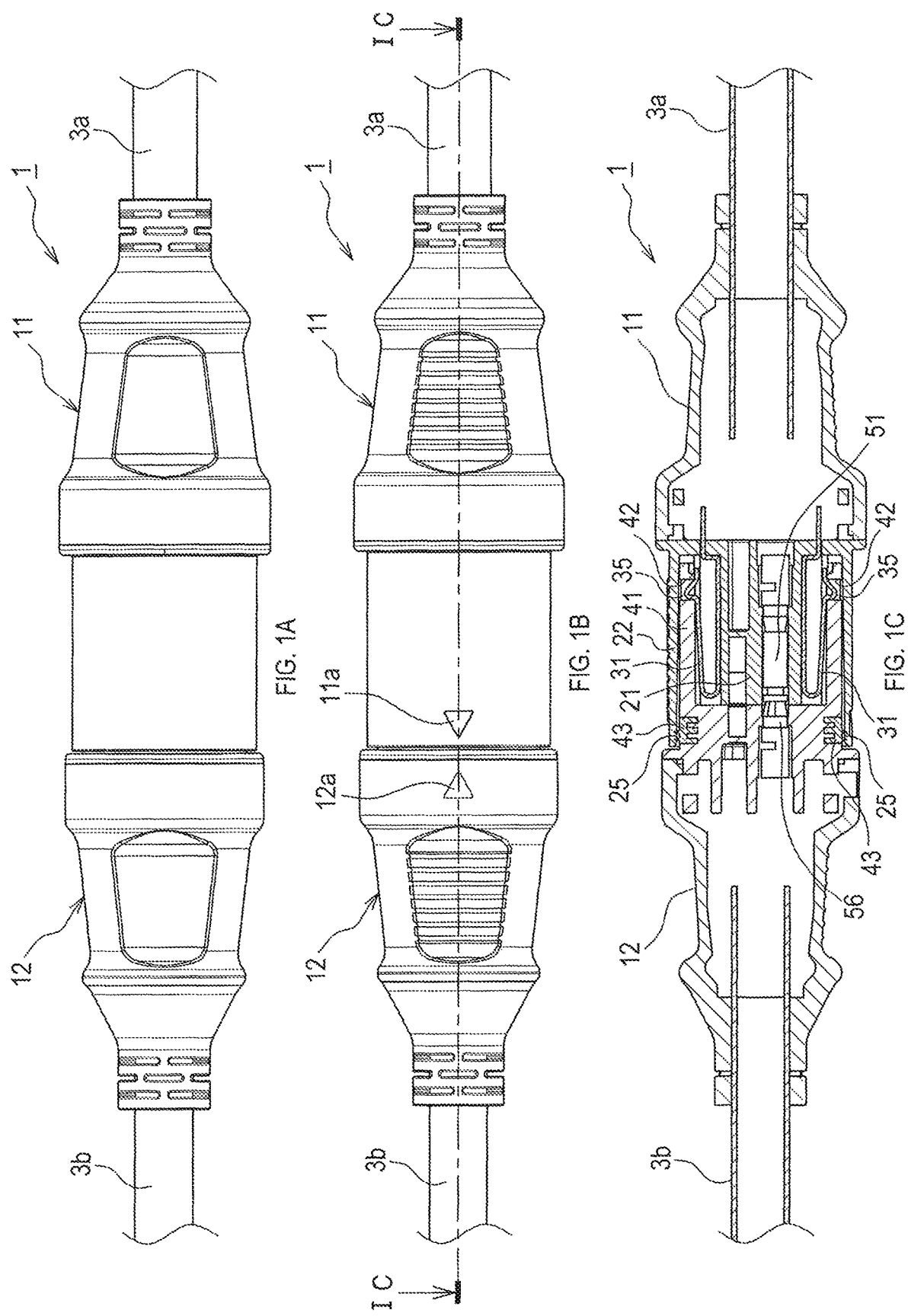
FIG. 1A is a front view of a connector of the present embodiment.
FIG. 1B is a bottom view of the connector of the present embodiment.
FIG. 1C is a sectional view taken along a line IC-IC in FIG. 1B.

A connector 1 of an example embodiment shown in FIGS. 1A-1C couples two cables (a cable 3a and a cable 3b). By coupling the two cables through the connector 1, various functions, such as electric power supply and communications, can be achieved between devices that are coupled to the respective cables. In FIG. 1C and subsequent sectional views, indication of an electric wire in the cable is omitted.

Figure 2:
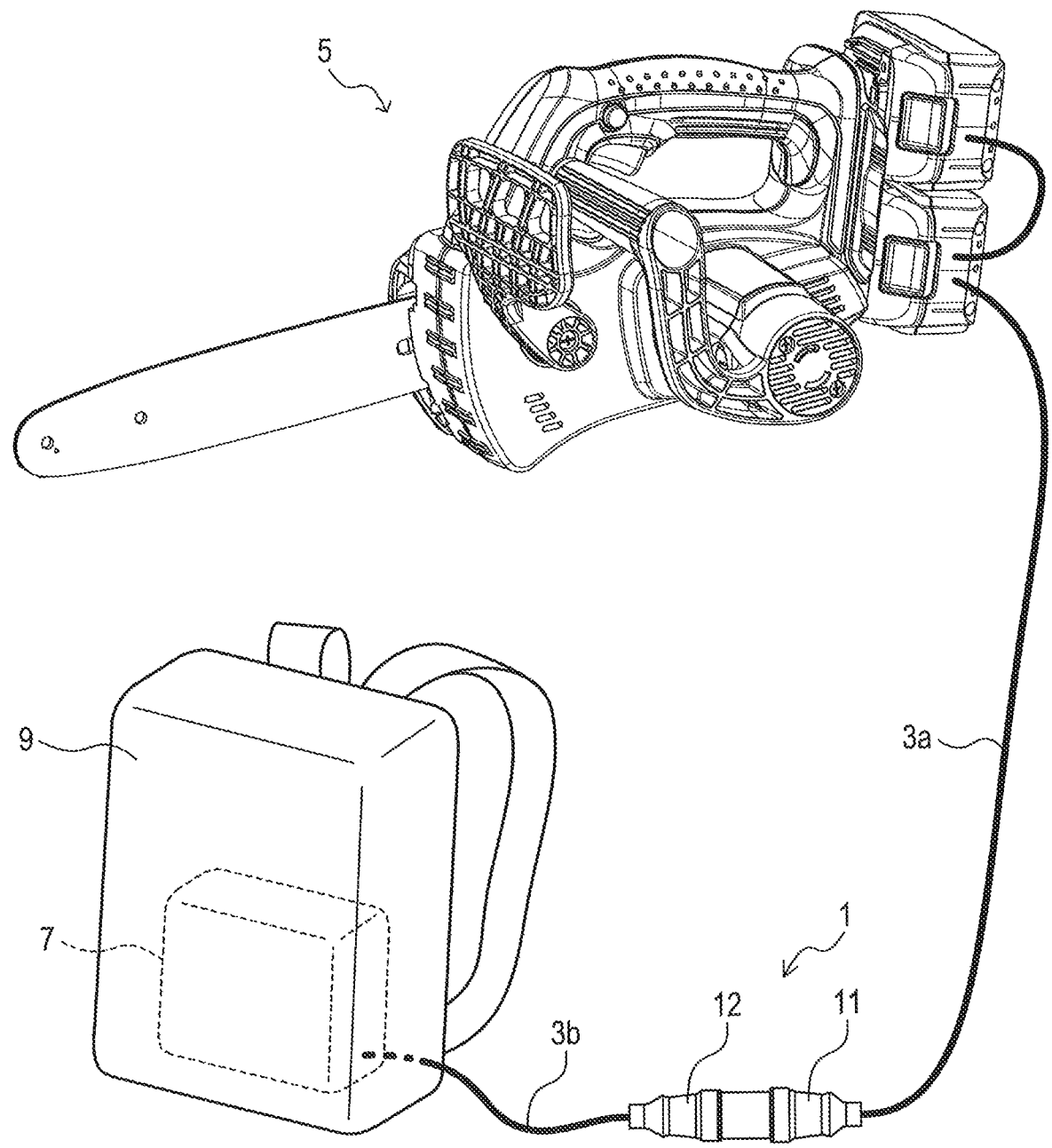
FIG. 2 is a view showing an electric working machine and a battery that are coupled using the connector of the present embodiment.

As shown in FIG. 2, the connector 1 in the present embodiment couples an electric working machine 5 and a battery 7 to supply electric power to the electric working machine 5. Here, a chainsaw is shown as one example of the electric working machine 5. The battery 7 may be provided in a battery holder 9. The battery holder 9 may hold one or more batteries 7 in an attachable and detachable manner. The battery holder 9 may hold the battery/batteries 7 in a non-detachable manner.

The connector 1 includes a first housing 11 and a second housing 12. As shown in FIG. 1B, the first housing 11 and the second housing 12 may be engageable in a specified position in which an indication mark 11a provided to the first housing 11 and an indication mark 12a provided to the second housing 12 face each other.

The first housing 11 holds at least one terminal (a terminal 51 to a terminal 55 described below) that is electrically coupled to the cable 3a. The second housing 12 holds at least one terminal (a terminal 56 to a terminal 60 described below) that is electrically coupled to the cable 3b. The terminals 51-55 correspond to examples of a first terminal of the present disclosure, and the terminals 56-60 correspond to examples of a second terminal of the present disclosure. In the present embodiment, the cable 3a is coupled to the electric working machine 5, and the cable 3b is coupled to the battery 7.

1-2. First Housing

As shown in FIGS. 1C, 3A-3B, and 4A-4C, the first housing 11 includes an insertion portion 21 and a displacement portion 31. The first housing 11 may also include a cover 22.

The insertion portion 21 has a columnar shape with a length along a specified direction. The specified direction here means a direction along which the first housing 11 moves relatively to the second housing 12 during a coupling operation of the first housing 11 and the second housing 12.

The cover 22, which has a tubular shape with an axial direction along the above-described specified direction, is arranged outside the insertion portion 21 so as to surround a side surface of the insertion portion 21. An inner surface of the cover 22 includes a first annular portion 25 extending along a circumferential direction of the cover 22. The circumferential direction here means a circumferential direction about an axis of the cover 22.

Figure 3A:
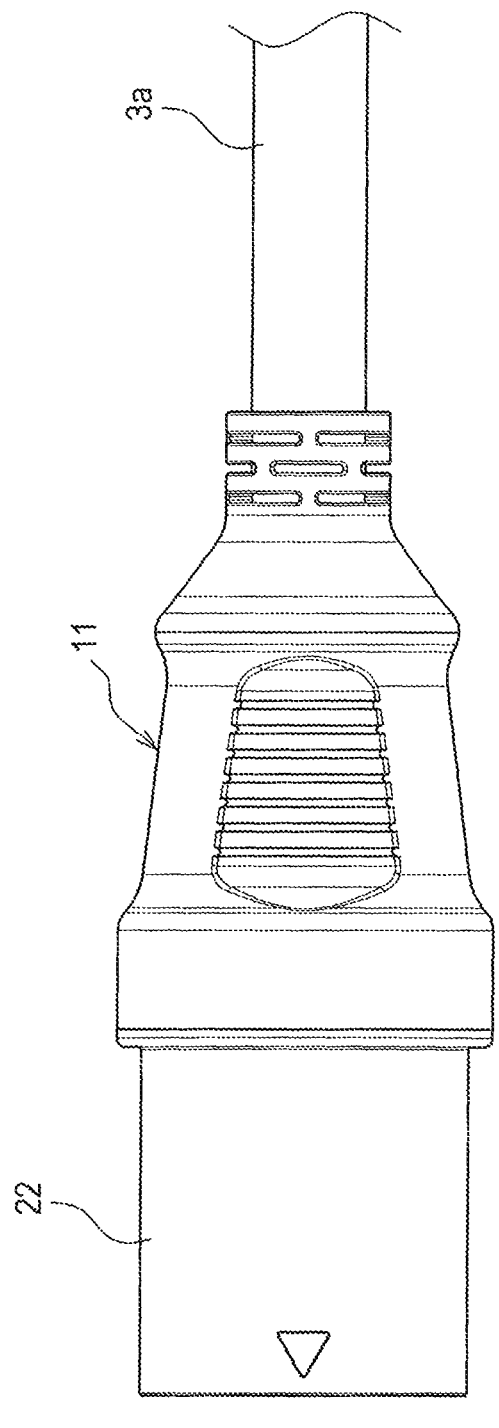
FIG. 3A is a bottom view of a first housing.
Figure 3B:
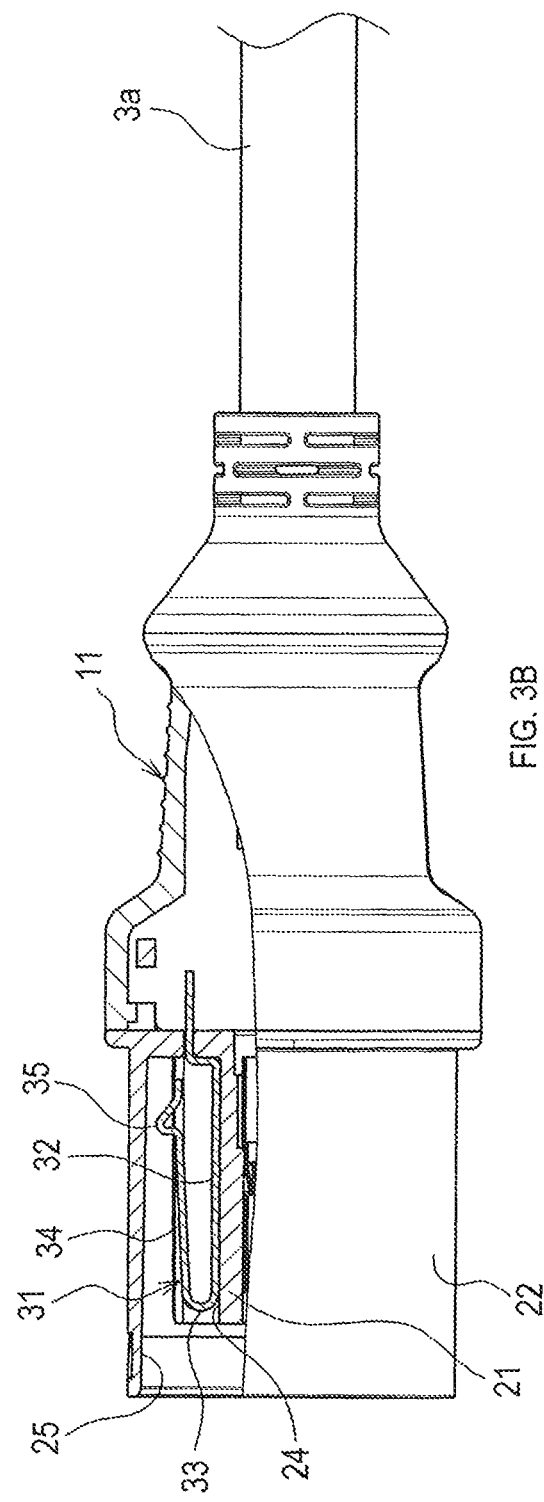
FIG. 3B is a partial sectional view of the first housing.

The displacement portion 31 is provided at an outer periphery 23 of the insertion portion 21. The displacement portion 31 is an elastically deformable spring member. As shown in FIG. 3B, the displacement portion 31 may include a fixing portion 32, a bent portion 33, and a movable portion 34. The displacement portion 31 may be manufactured, for example, by press working of a thin metal plate.

The fixing portion 32 is a plate-shaped portion fixed to the first housing 11. "Fixed to the first housing 11" here means a state where displacement with respect to the first housing 11 is relatively restricted as compared with the bent portion 33 and the movable portion 34. In the present embodiment, a part of the fixing portion 32 is fixed to the first housing 11. The fixing portion 32 may be indirectly fixed to the first housing 11.

The fixing portion 32 has a width slightly larger than that of the bent portion 33 and the movable portion 34. The movable portion 34 has a facing surface that faces the fixing portion 32. The bent portion 33 connects the fixing portion 32 and the movable portion 34. The fixing portion 32 is arranged in the insertion portion 21 such that the bent portion 33 is positioned in a protruding direction, that is, at a distal side of the insertion portion 21, and such that the movable portion 34 is positioned at a proximal side of the insertion portion 21. The movable portion 34 of the displacement portion 31 includes a moving member 35.

The moving member 35 is a portion in which the movable portion 34 is partially bent to protrude in a direction of departing from the insertion portion 21. The moving member 35 is provided at a side of the displacement portion 31 opposite to the protruding direction of the insertion portion 21 (that is, at the proximal side of the insertion portion 21).

Figure 4A:
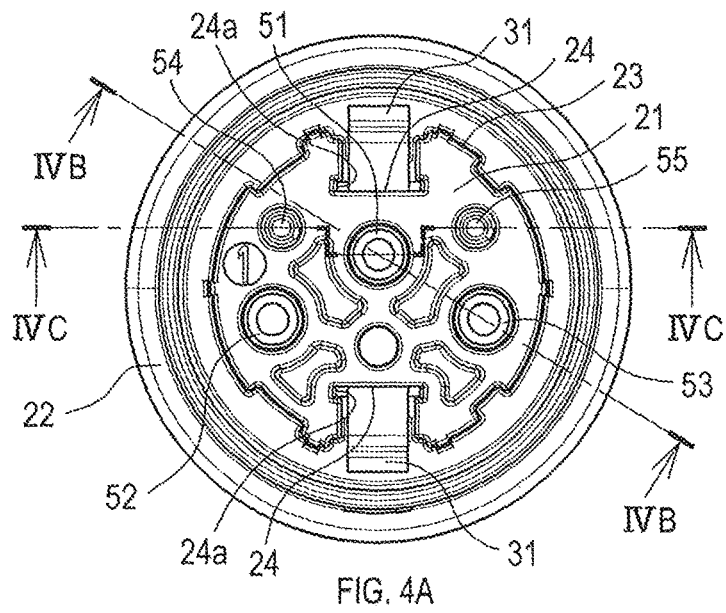
FIG. 4A is a side elevational view of the first housing.

A more detailed description will be given of arrangement of the displacement portion 31. The insertion portion 21 includes a groove 24 recessed toward a central axis of the insertion portion 21. The fixing portion 32 of the displacement portion 31 is arranged in the groove 24. As shown in FIG. 4A, an innermost part 24a of the groove 24 at a central axis side of the insertion portion 21 is formed to have a slightly larger width, in accordance with a width of the fixing portion 32. Since the fixing portion 32 is inserted into the innermost part 24a, a moving range of the fixing portion 32 is restricted.

Since the displacement portion 31 is configured as described above, the movable portion 34 is elastically displaceable along an intersecting direction that is a direction intersecting the above-described specified direction. In other words, the movable portion 34 is elastically displaceable so as to approach or depart from the fixing portion 32. The moving member 35 is displaced together with the movable portion 34, and thus is elastically displaceable in the above-described intersecting direction.

Figure 4B:
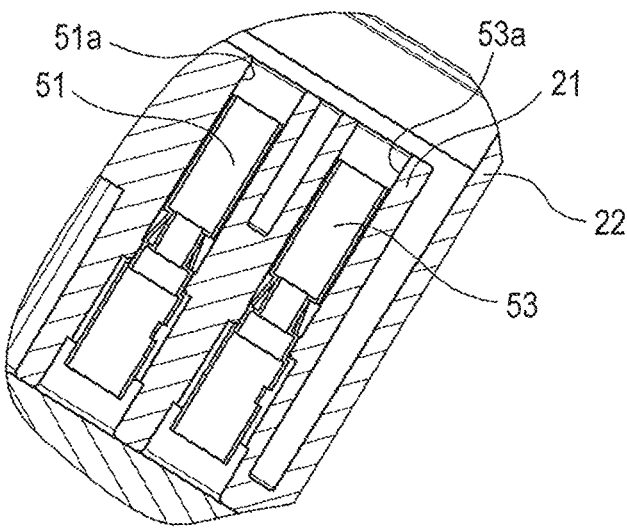
FIG. 4B is a sectional view taken along a line IVB-IVB in FIG. 4A.
Figure 4C:
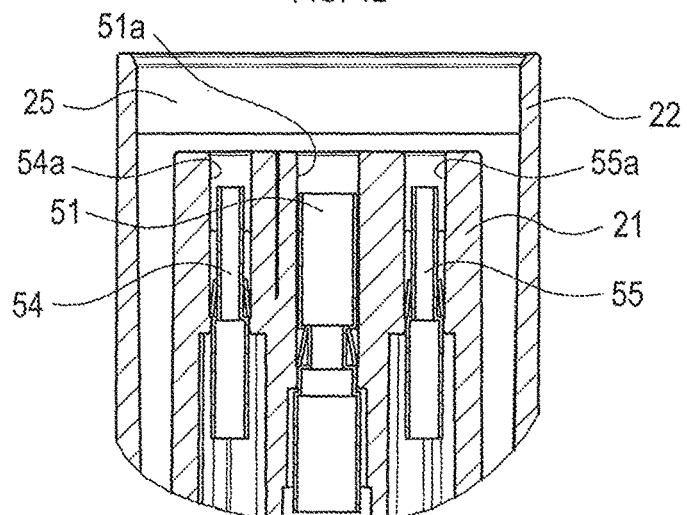
FIG. 4C is a sectional view taken along a line IVC-IVC in FIG. 4A.

As shown in FIGS. 4A-4C, the terminals 51-55 held by the first housing 11 are arranged in the insertion portion 21. More specifically, the terminals 51-55 are arranged in respective through holes 51a-55a that are provided in the insertion portion 21 to penetrate along the above-described specified direction.

In the present embodiment, the terminals 51-53 are electric power supply terminals. The terminals 54 and 55 are communication terminals. The terminal 54 is used for communicating a signal for allowing power supply between the battery 7 and the electric working machine 5. The terminal 55 is used for communicating a signal for identifying a counterpart device. The number of terminals provided in the first housing 11 may be one or more, and is not limited. The usage of the one or more terminals provided in the first housing 11 is not limited the configuration of the present embodiment.

1-3. Second Housing

As shown in FIGS. 1C, 5A-5C, and FIG. 6A-6B, the second housing 12 includes a tubular portion 41. The tubular portion 41 allows insertion therein of the insertion portion 21. Upon insertion of the insertion portion 21 to an innermost part of the tubular portion 41, the terminals 51-55 in the first housing 11 and the terminal 56-60 in the second housing 12 are electrically coupled. A relative position of the insertion portion 21 to the tubular portion 41 in this state is referred to as a "locking position" in the description below. Also, a state of the connector 1 is referred to as a "locked state" when the insertion portion 21 is inserted in the tubular portion 41 through to the locking position.

The tubular portion 41 includes a locking portion 42. The locking portion 42 is a through hole provided in the tubular portion 41, and has a size allowing insertion therein of the moving member 35. Thus, when the insertion portion 21 is in the locking position, the moving member 35 enters into the locking portion 42, and then the locking portion 42 and the moving member 35 lock each other.

An outer surface of the tubular portion 41 includes a second annular portion 43 extending along a circumferential direction of the tubular portion 41. The circumferential direction here means a circumferential direction about an axis of the tubular portion 41. The second annular portion 43 is made of a different material from a material for other parts of the tubular portion 41. The different material may be an elastically deformable flexible material, such as elastomer, and may be a softer and less rigid material than the first housing 11 and the second housing 12. Specifically, materials, such as Thermoplastic Elastomers (TPE) and Polyvinyl Chloride (PVC), may be employed as a material for the second annular portion 43.

Figure 5A:
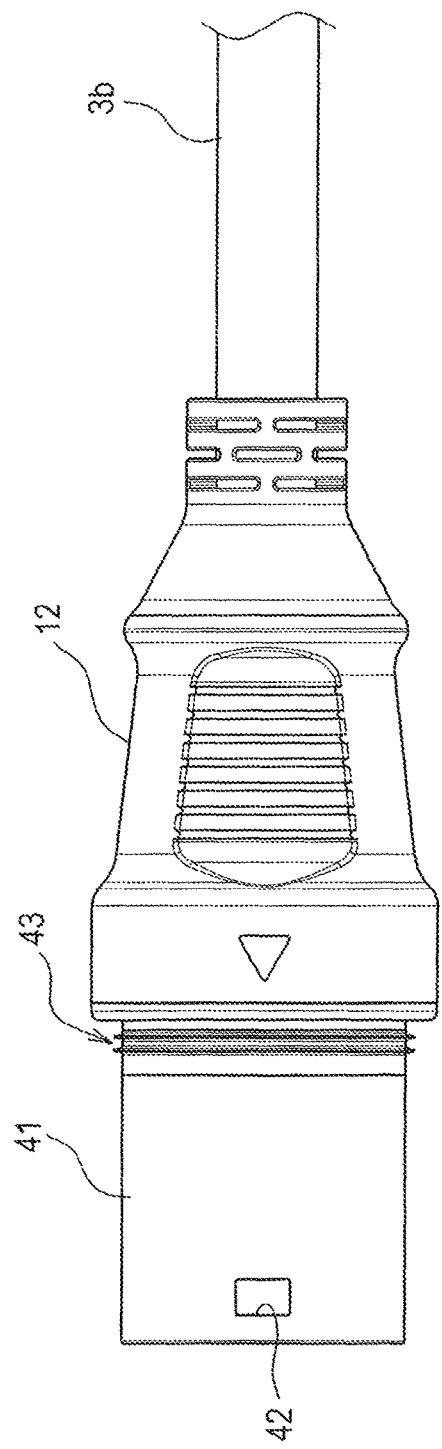
FIG. 5A is a bottom view of a second housing.
Figure 5B:
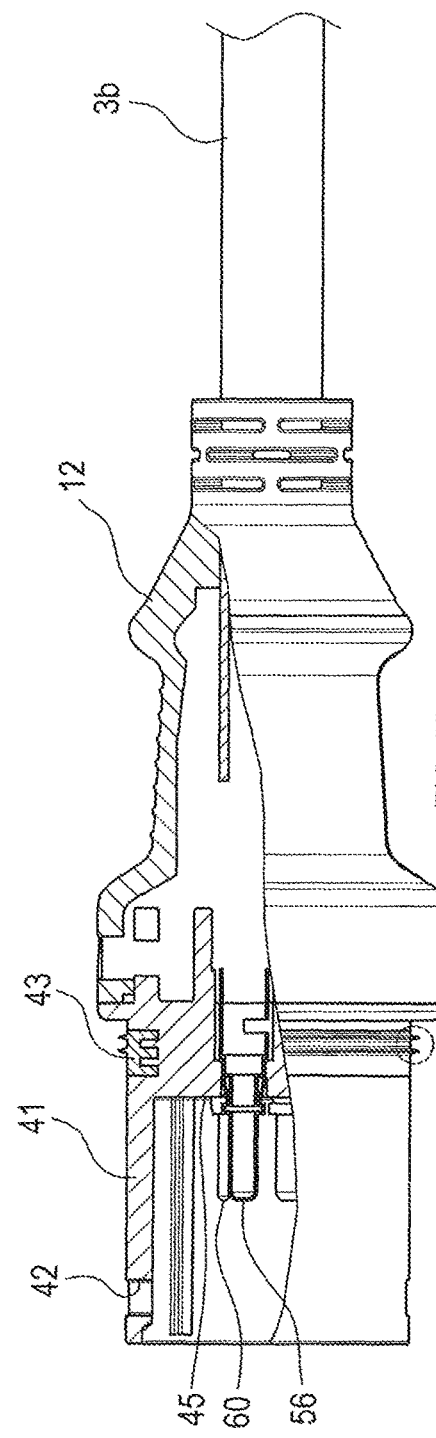
FIG. 5B is a partial sectional view of the second housing.
Figure 5C:
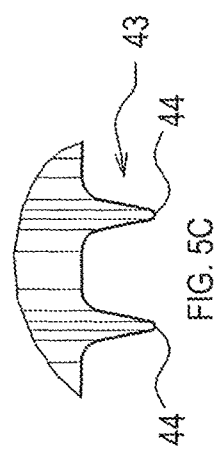
FIG. 5C is an enlarged view of protruding portions.

The second annular portion 43 may include two protruding portions 44 that protrude from an area around the second annular portion 43 in the tubular portion 41. As shown in FIG. 5C, a sectional shape of each of the two protruding portions 44 along a plane parallel to the axis of the tubular portion 41 has a pointed end in an outward direction. In other words, the protruding portions 44 each have a tapered shape with a decreasing thickness toward the pointed end. The aforementioned outward direction means a direction facing the first annular portion 25 of the cover 22 in the locked state.

Figure 6A:
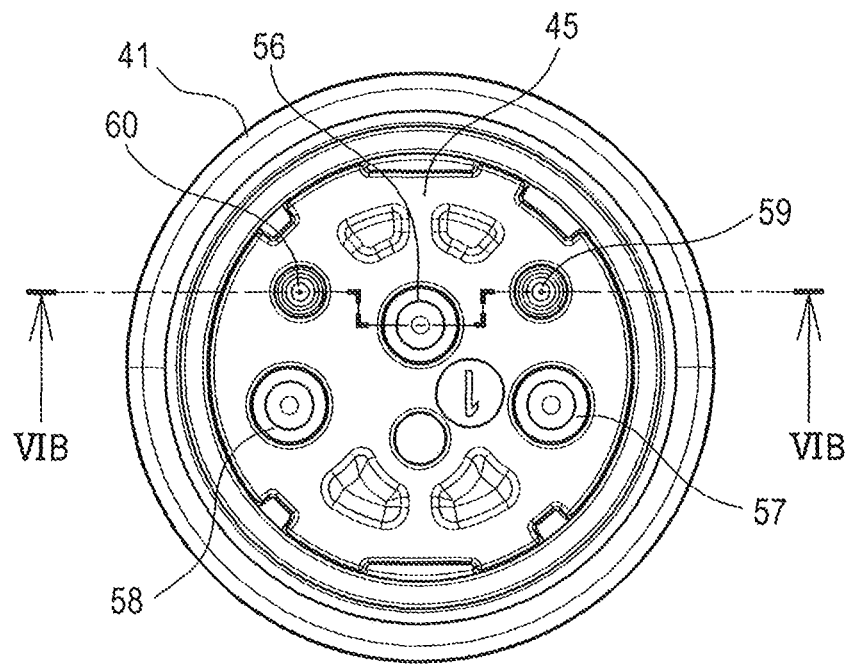
FIG. 6A is a side elevational view of the second housing.
Figure 6B:
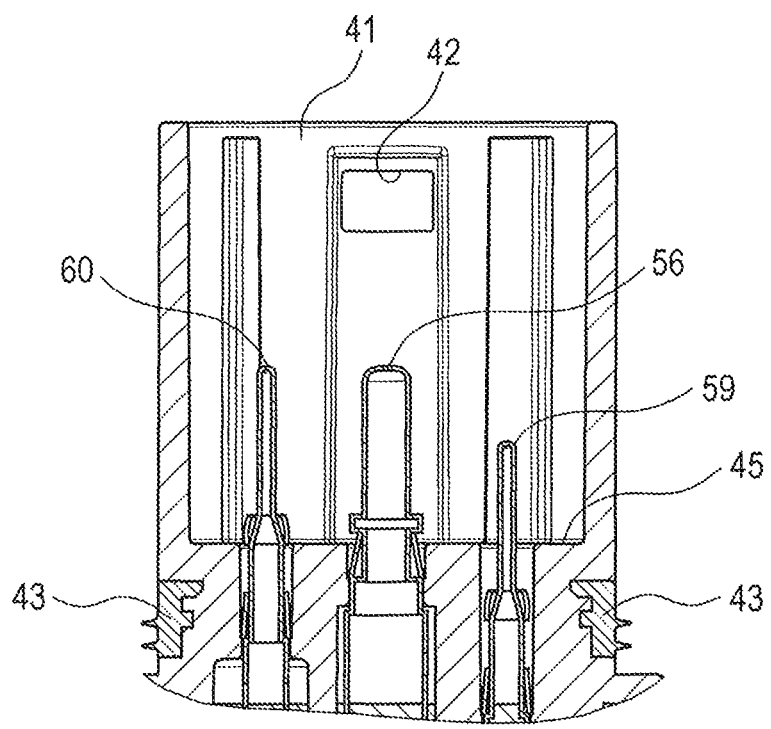
FIG. 6B is a sectional view taken along a line VIB-VIB in FIG. 6A.

As shown in FIG. 6B, terminals 56-60 held by the second housing 12 are arranged in the tubular portion 41, and extend from the bottom surface 45 of the tubular portion 41 toward an opening. The terminals 56-58 are electric power supply terminals. The terminals 59-60 are communication terminals. The terminal 59 is configured to be coupled to the terminal 54, and the terminal 60 is configured to be coupled to the terminal 55. The number of terminals provided in the second housing 12 may be one or more, and is not limited. The usage of the one or more terminals provided in the second housing 12 is not limited the configuration of the present embodiment.

1-4. Engagement of First Housing with Second Housing

A description will be given of a behavior of the first housing 11 and the second housing 12 at the time of engaging with reference to FIGS. 1C and 7A-7B.

As shown in FIG. 7A, while the moving member 35 is not elastically displaced (i.e., while no load is applied), the tubular portion 41 abuts the moving member 35 to thereby inhibit insertion of the insertion portion 21 through to the locking position.

Once a load is applied to the moving member 35, causing elastic displacement of the moving member 35 toward the central axis of the insertion portion 21, a state of inhibiting insertion of the insertion portion 21 is released. For example, if a user applies, to the insertion portion 21, a force greater than a specified magnitude to insert the insertion portion 21 into the tubular portion 41, then the displacement portion 31 is elastically deformed such that the movable portion 34 is displaced toward the fixing portion 32, resulting in displacement of the moving member 35.

As shown in FIG. 7B, while the moving member 35 is elastically displaced through to an inner position, which is a position close to the central axis of the insertion portion 21, inhibition of insertion of the insertion portion 21 due to the abutment of the moving member 35 with the tubular portion 41 is less likely to occur, and insertion of the insertion portion 21 through to the locking position is enabled.

As shown in FIG. 1C, the locking portion 42 allows the moving member 35 to move outwardly from the inner position while the insertion portion 21 is in the locking position. Upon entering of the moving member 35 into the locking portion 42, the locking portion 42 and the moving member 35 lock each other. As a result, pullout of the insertion portion 21 from the tubular portion 41 is inhibited.

In the locked state, by pulling the first housing 11 and the second housing 12 away from each other with a force of a specified magnitude or greater, the displacement portion 31 is elastically deformed, and the moving member 35 is displaced through to the inner position shown in FIG. 7B. In this state, the insertion portion 21 can be pulled out from the locking position.

In the locked state, the cover 22 surrounds the tubular portion 41, and the first annular portion 25 and the protruding portions 44 of the second annular portion 43 contact each other. Since the protruding portions 44 each have an outer diameter greater than an inner diameter of the first annular portion 25, the protruding portions 44 are elastically deformed inwardly. Due to high flexibility of the protruding portions 44, the protruding portions 44 and the first annular portion 25 contact tightly. Accordingly, the first annular portion 25 and the second annular portion 43 form a waterproof structure restricting passage of water between the first annular portion 25 and the second annular portion 43 upon insertion of the insertion portion 21 into the tubular portion 41 through to the locking position.

1-5. Coupling of Terminals by Engagement

A description will be given of a coupling state of the terminals with reference to FIGS. 8A-8D.

Figure 8A:
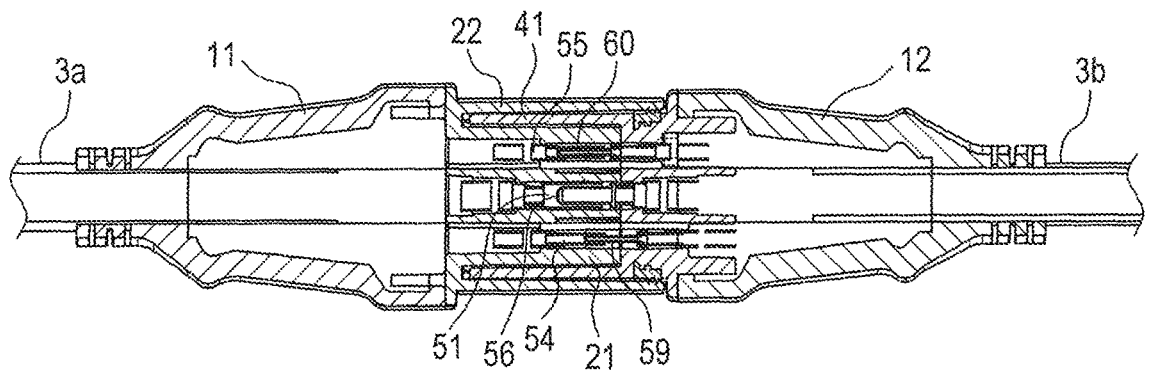
FIG. 8A is a sectional view showing the first housing and the second housing in a locked state.

In FIG. 8A, the first housing 11 and the second housing 12 are in the locked state, and the terminals contact the respective corresponding terminals. Specifically, FIG. 8A shows a state where the terminal 51 contacts the terminal 56, the terminal 54 contacts the terminal 59, and the terminal 55 contacts the terminal 60.

Figure 8B:
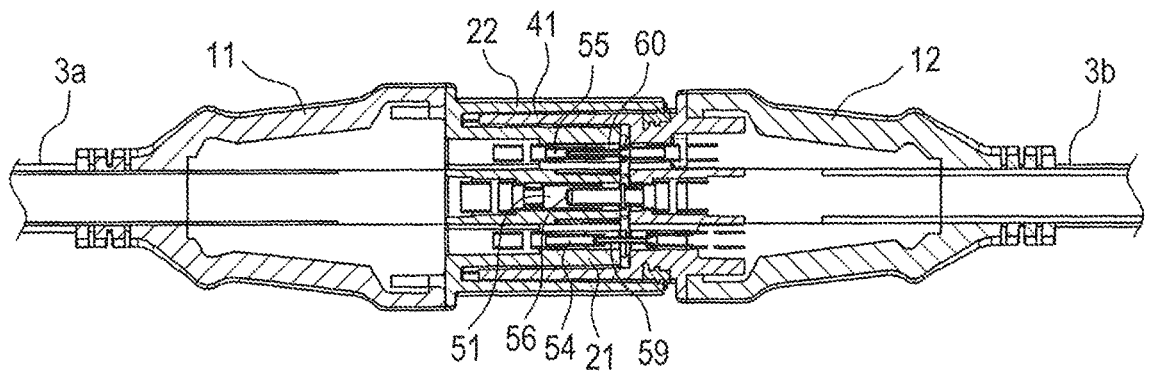
FIG. 8B is a sectional view showing the first housing and the second housing slightly separated compared with the locked state.

In FIG. 8B, although the first housing 11 and the second housing 12 are released from the locked state and slightly separated from each other, all of the terminals contact the corresponding terminals.

Figure 8C:
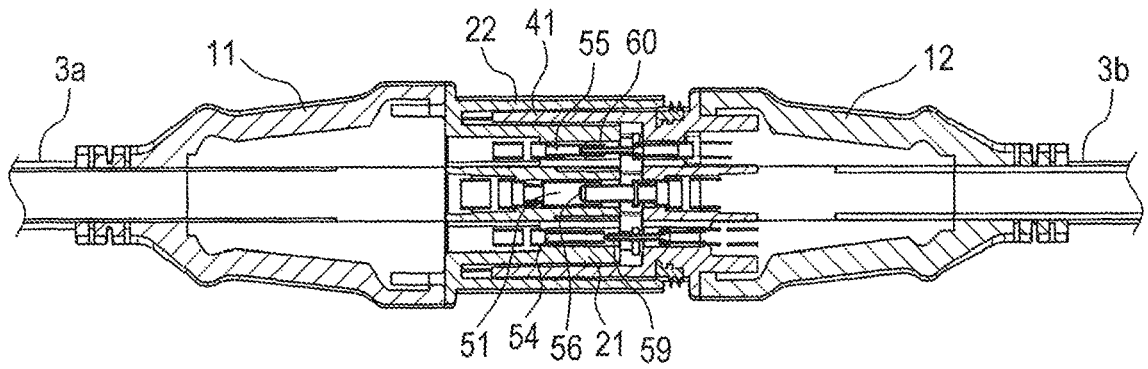
FIG. 8C is a sectional view when contact between terminals for communicating a signal for allowing power supply is released.

When the first housing 11 and the second housing 12 are separated to a position shown in FIG. 8C, the terminal 54 becomes separated from the terminal 59. However, the remaining terminals still contact the corresponding terminals. The terminals 54 and 59 are used for communicating a signal for allowing power supply. Thus, when the first housing 11 and the second housing 12 are separated from each other to the positions shown in FIG. 8C, a signal for allowing power supply is not communicated, and power supply from the battery is stopped.

Figure 8D:
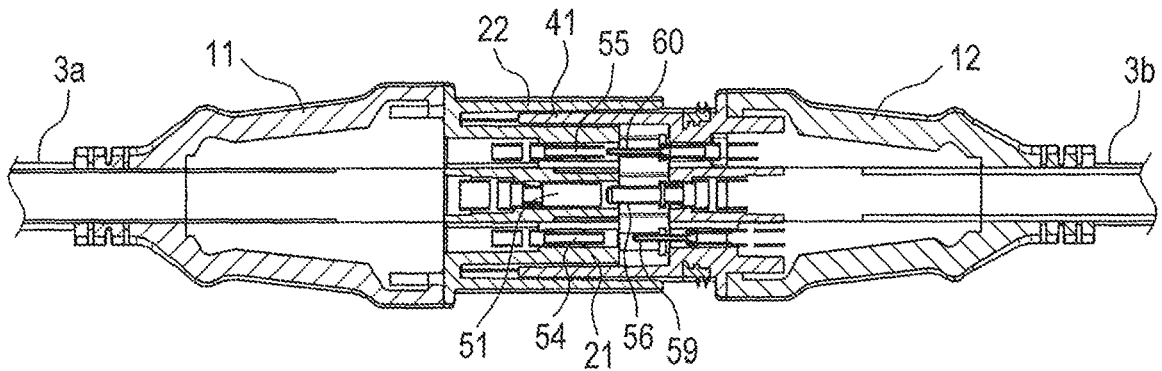
FIG. 8D is a sectional view when contact between the power supply terminals is released.

When the first housing 11 and the second housing 12 are separated to positions shown in FIG. 8D, all of the terminals become separated from the corresponding terminals.

As described above, the connector 1 is configured such that the terminals for communicating a signal for allowing power supply are separated first. Thus, when detaching the first housing 11 from the second housing 12, power supply from the battery is stopped first, and then the contact between the power supply terminals is released. This enables inhibiting occurrence of damage to the power supply terminals. If, for example, power supply using the terminals 51 and 56 continues until the terminals 51 and 56 become separated from each other, an arc might occur at the time of separation of the terminals 51 and 56, resulting in damage to the terminals 51 and 56. In contrast, the connector 1 of the present embodiment reduces such a risk.

In the present embodiment, a configuration to first interrupt a signal for allowing power supply as described above is achieved by the terminal 59 having a protrusion amount smaller than a protrusion amount of the terminal 56. However, a specific configuration is not limited to the above-described configuration, and any configuration may be employed in which paired terminals used to communicate a signal for allowing power supply are separated from each other earlier than the power supply terminals. A separation timing of the paired terminals may be easily adjusted by adjusting a relative positional relationship between the paired terminals. For example, the terminal 59 may have the same protrusion amount as that of the terminal 56, and instead the terminal 54 may be arranged more inwardly in the insertion portion 21 than the terminal 51.

Also, the connector 1 need not include the above-described configuration of the terminals to reduce damage to the terminals 1-6. Effects The embodiment detailed above enables achievement of the following effects:

(1a) In the connector 1, an engaged state between the first housing 11 and the second housing 12 is maintained by locking of the moving member 35 with the locking portion 42 using an elastic force of the displacement portion 31. The displacement portion 31 is arranged at an outer periphery 23 of the insertion portion 21, and engagement between the first housing 11 and the second housing 12 is allowed when the moving member 35 is displaced toward the central axis of the insertion portion 21 (that is, inwardly). Thus, the tubular portion 41 of the second housing 12 is not required to provide a space for displacement of the moving member 35, allowing size reduction of the second housing 12. This enables size reduction of the entire connector 1.

(1b) The terminals held by the first housing 11 are provided inside the insertion portion 21. If any terminal is provided outside the insertion portion 21, the first housing 11 will become larger in size. Providing the terminals inside the insertion portion 21 as in the present embodiment can inhibit size increase of the entire first housing 11.

(1c) Since the displacement portion 31 is at least partially arranged in the groove 24, a protrusion amount of the displacement portion 31 from the insertion portion 21 can be reduced. This enables size reduction of the tubular portion 41, and thus size reduction of the entire connector.

(1d) Since the displacement portion 31 is a spring member, a high engagement strength between the first housing 11 and the second housing 12 can be achieved. Also, since the displacement portion 31 is a spring member formed by bending a metal plate, the displacement portion 31 has a large movable range, and thus has an improved durability.

Also, the free end of the movable portion 34 of the displacement portion 31 is positioned at a proximal side of the insertion portion 21. Thus, the movable portion 34 is less likely to be damaged during insertion of the insertion portion 21 into the tubular portion 41.

Further, in a state where the moving member 35 is pressed by the tubular portion 41 toward the inner position, a friction force is generated between the moving member 35 and the tubular portion 41. While the friction force is acting, relative movement between the insertion portion 21 and the tubular portion 41 requires a greater force. However, since the moving member 35 is positioned in the displacement portion 31 at the proximal side of the insertion portion 21, the moving member 35 does not abut the tubular portion 41 until the insertion portion 21 is inserted deeply into the tubular portion 41. Thus, it is possible to reduce a range in which the relative movement between the insertion portion 21 and the tubular portion 41 is performed under the friction force, and smooth insertion of the insertion portion 21 into the tubular portion 41 can be achieved.

(1e) The first housing 11 including the tubular cover 22 enables an improved protection of the terminals. Also, the first annular portion 25 of the cover 22 and the second annular portion 43 of the tubular portion 41 form a waterproof structure, which can achieve an improved waterproof function of the connector 1.

The second annular portion 43 includes the protruding portions 44 that protrude outwardly from at least a surrounding area of the protruding portions 44 in the tubular portion 41. Thus, the protruding portions 44 can make a sufficient contact with the first annular portion 25, thereby achieving an improved waterproof function of the connector 1. Also, the protruding portions 44, each of which has a tapered shape with a decreasing thickness toward its protruding end, can inhibit generation of excessive friction forces. This enables avoidance of deterioration in easiness of attachment and detachment, and in clicking feeling when the moving member 35 is inserted into the groove 24. Further, the second annular portion 43, which is made of an elastically deformable flexible material, can achieve tight contact, and thus can provide an improved waterproof function.

2. Other Embodiments

Although one embodiment of the present disclosure has been described above, it is to be understood that the present disclosure is not limited to the aforementioned embodiment, but may be implemented in various forms within the technical scope of the present disclosure.

(2a) The shape of the connector of the present disclosure is not limited to that of the connector 1 of the aforementioned embodiment. For example, although the aforementioned embodiment exemplifies the insertion portion 21 having a columnar shape and the tubular portion 41 having a cylindrical shape, the insertion portion and the tubular portion may have any shapes that allow insertion of the insertion portion into the tubular portion. For example, the insertion portion may have a rectangular parallelepiped shape and the tubular portion may have a square cylindrical shape.

(2b) The aforementioned embodiment exemplifies a configuration in which the displacement portion 31 is a spring member and having a bent plate shape. However, any displacement portion that includes an elastically displaceable moving member may be employed. For example, a spring member having a different configuration from that disclosed in the aforementioned embodiment may be employed, and an elastic material, such as rubber, other than a spring member may be employed. Also, a part of the insertion portion of the first housing may be configured elastically displaceable by, for example, forming a cutout, and a moving member may be provided in the elastically displaceable part.

Further, the aforementioned embodiment exemplifies a configuration in which the displacement portion 31 is provided in the groove 24 of the insertion portion 21. However, the insertion portion 21 need not include the groove 24, and the displacement portion 31 may be provided in an area other than the groove 24.

Moreover, the aforementioned embodiment exemplifies a configuration in which the moving member 35 is positioned in the displacement portion 31 at the proximal side of the insertion portion 21 (opposite to the protruding direction of the insertion portion 21). However, there is no limitation to the position of the moving member 35, and the moving member 35 may be provided, for example, in the displacement portion 31 at a distal side of the insertion portion 21.

(2c) The aforementioned embodiment exemplifies a configuration in which the first housing 11 includes the cover 22. However, the first housing 11 need not include the cover 22. The first housing 11 may include a cover having a different shape from that of the cover 22. Further, a waterproof structure need not be configured by a cover.

(2d) The aforementioned embodiment exemplifies a configuration in which the second annular portion 43 includes the protruding portions 44 protruding toward the first annular portion 25. However, in place of the second annular portion 43, the first annular portion 25 may at least partially protrude toward the second annular portion 43. Also, both of the first annular portion 25 and the second annular portion 43 may include protruding portions, or neither the first annular portion 25 nor the second annular portion 43 may include a protruding portion. Further, although the aforementioned embodiment exemplifies the protruding portions 44 each having a tapered shape, any shape may be employed. For example, a so-called O-ring may be employed in place of the protruding portions 44.

(2e) The aforementioned embodiment exemplifies a configuration in which five terminals are arranged in each of the first housing 11 and the second housing 12. However, there is no limitation to the number of terminals except that at least one terminal in each of the housings is required. Also, although the first terminal (terminals 51-55) is arranged in the insertion portion 21 of the first housing 11 in the exemplified configuration, the first terminal may be arranged in a location other than the insertion portion 21. Further, the first terminal may be arranged in the insertion portion 21 so as to protrude outside the insertion portion 21.

(2f) The aforementioned embodiment exemplifies a chainsaw as one example of an electric working machine. However, the connector of the present disclosure may be applied to coupling between one of various types of electric working machines, each of which is configured to receive power supply from a battery, and a battery. Examples of the electric working machines may include an electric hammer, an electric hammer drill, an electric drill, an electric driver, an electric wrench, an electric grinder, an electric circular saw, an electric reciprocating saw, an electric jigsaw, an electric cutter, an electric planer, an electric nail gun (including a tacker), an electric hedge trimmer, an electric lawn mower, an electric lawn trimmer, an electric grass cutter, an electric cleaner, an electric blower, an electric sprayer, an electric spreader, an electric dust collector, a worksite lighting, and an audio device for work sites, such as a radio and a speaker. The connector of the present disclosure may be used for purposes other than coupling between an electric working machine and a battery.

(2g) A plurality of functions performed by a single element in the aforementioned embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the aforementioned embodiments may be omitted. Moreover, at least a part of a configuration in the aforementioned embodiments may be added to, or may replace, another configuration in the aforementioned embodiments.

What is claimed is:

1. A connector for coupling a first cable and a second cable, the connector comprising:
   a first housing; and
   a second housing,
      the first housing including:
         a first terminal to be electrically coupled to the first cable;
         an insertion portion having a columnar shape with a length along a specified direction; and
         a displacement portion that is provided at an outer periphery of the insertion portion and includes a moving member elastically displaceable in an intersecting direction that intersects the specified direction,
      the second housing including:
         a second terminal to be electrically coupled to the second cable;
         a tubular portion configured to allow insertion therein of the insertion portion through to a locking position in which the first terminal and the second terminal are electrically coupled to each other,
   wherein the tubular portion is configured to abut the moving member to thereby inhibit insertion of the insertion portion through to the locking position, while the moving member is not elastically displaced, and configured to allow insertion of the insertion portion through to the locking position and pullout of the insertion portion from the locking position, while the moving member is elastically displaced to an inner position, which is a position close to a central axis of the insertion portion, and
   wherein the tubular portion includes a locking portion, the locking portion being configured, while the insertion portion is located in the locking position, to allow movement of the moving member outwardly from the inner position, and to lock with the moving member, to thereby inhibit pullout of the insertion portion from the tubular portion.

2. The connector according to claim 1,
   wherein the first terminal is arranged in the insertion portion.

3. The connector according to claim 1,
   wherein the insertion portion includes a groove recessed toward the central axis, and
   wherein the displacement portion is at least partially arranged in the groove.

4. The connector according to claim 1,
   wherein the displacement portion is formed of a spring member and includes:
      a plate-shaped fixing portion fixed to the first housing;
      a movable portion having a facing surface that faces the fixing portion; and
      a bent portion connecting the fixing portion and the movable portion, and
   wherein the moving member is provided in the movable portion.

5. The connector according to claim 4,
   wherein the displacement portion is arranged in the insertion portion such that the bent portion is positioned at a distal side of the insertion portion, and the movable portion is positioned at a proximal side of the insertion portion.

6. The connector according to claim 1,
   wherein the moving member is provided in the displacement portion at a proximal side of the insertion portion.

7. The connector according to claim 1,
   wherein the first housing includes a tubular cover arranged outside the insertion portion and configured to surround the tubular portion upon insertion of the insertion portion into the tubular portion through to the locking position.

8. The connector according to claim 7,
   wherein an inner surface of the cover includes a first annular portion extending along a circumferential direction of the cover,
   wherein an outer surface of the tubular portion includes a second annular portion extending along a circumferential direction of the tubular portion, and
   wherein the first annular portion and the second annular portion are configured to contact each other and form a waterproof structure upon insertion of the insertion portion into the tubular portion through to the locking position.

9. The connector according to claim 8,
   wherein the second annular portion includes a protruding portion that protrudes outwardly from an area around the second annular portion in the tubular portion.

10. The connector according to claim 8,
    wherein at least one of the first annular portion or the second annular portion is made of an elastically deformable flexible material.

11. The connector according to claim 8,
    wherein at least one of the first annular portion or the second annular portion has a tapered shape with a decreasing thickness toward a protruding end.

12. The connector according to claim 1,
    wherein one of the first cable and the second cable is coupled to an electric working machine, and the other of the first cable and the second cable is coupled to a battery that supplies electric power to the electric working machine.

* * * * *